(12) United States Patent
Ralph et al.

(10) Patent No.: US 9,516,886 B2
(45) Date of Patent: Dec. 13, 2016

(54) EFFECTIVE ANIMAL STUNNING

(71) Applicant: Wagstaff Food Services Pty Ltd, Malvern, VIC (AU)

(72) Inventors: James Henry Ralph, Malvern (AU); David William Mclean, Wollongong (AU)

(73) Assignee: Wagstaff Food Services Pty Ltd, Malvern, VIC (AU)

( * ) Notice: Subject to any disclaimer, the term of this patent is extended or adjusted under 35 U.S.C. 154(b) by 0 days.

(21) Appl. No.: 14/440,327

(22) PCT Filed: Nov. 4, 2013

(86) PCT No.: PCT/AU2013/001271
§ 371 (c)(1),
(2) Date: May 1, 2015

(87) PCT Pub. No.: WO2014/066953
PCT Pub. Date: May 8, 2014

(65) Prior Publication Data
US 2015/0296811 A1    Oct. 22, 2015

Related U.S. Application Data

(63) Continuation-in-part of application No. 13/668,030, filed on Nov. 2, 2012, now Pat. No. 8,506,366.

(51) Int. Cl.
*A22B 3/00* (2006.01)
*A22B 3/06* (2006.01)

(52) U.S. Cl.
CPC .. *A22B 3/00* (2013.01); *A22B 3/06* (2013.01)

(58) Field of Classification Search
USPC ...................................................... 452/57–60
See application file for complete search history.

(56) References Cited

U.S. PATENT DOCUMENTS 3,973,290 A * 8/1976 Schwartz ................. A22B 3/06
                                                                219/771
4,586,216 A    5/1986 Grajoszex
(Continued)

FOREIGN PATENT DOCUMENTS

DE    2228706         12/1973
DE    4116670 A1    11/1992
(Continued)

OTHER PUBLICATIONS

PCT International Search Report, PCT/AU2011/000527 dated Aug. 8, 2011.
(Continued)

*Primary Examiner* — Richard Price, Jr.
(74) *Attorney, Agent, or Firm* — TraskBritt, P.C.

(57) ABSTRACT

An animal stunning apparatus for inducing unconsciousness and insensibility of a live subject animal includes an applicator for contacting an application point on the live subject animal's head and couples microwave radiation to the head. A microwave generator generates microwave energy of a suitable power level and frequency, and a waveguide directs the microwave radiation to the applicator. An auto-tuner in the waveguide uses a directional coupler to detect forward and reflected power and to tune in real time the impedance for matching the load and optimize effective power transfer. A switch discontinues the application of microwave radiation that is heating the frontal portion of the brain after a period of time sufficient to induce the unconsciousness and insensibility. Methods for inducing rapid unconsciousness and insensibility in an animal include application of microwave radiation.

20 Claims, 4 Drawing Sheets

(56) References Cited

U.S. PATENT DOCUMENTS

| | | | |
|---|---|---|---|
| 4,616,120 A | 10/1986 | Maruyama et al. | |
| 4,875,253 A * | 10/1989 | Lambooy | A22B 3/06 452/141 |
| 4,953,263 A * | 9/1990 | Lambooy | A22B 3/06 452/58 |
| 5,692,951 A | 12/1997 | Huff | |
| 5,704,830 A | 1/1998 | Van Ochten | |
| 5,888,132 A * | 3/1999 | Burnett | A22B 3/06 452/141 |
| 5,899,802 A * | 5/1999 | Burnett | A22B 3/06 452/141 |
| 6,338,673 B2 * | 1/2002 | Berry | 452/58 |
| 6,471,576 B1 * | 10/2002 | Ross | A22B 3/06 452/58 |
| 7,241,212 B2 * | 7/2007 | Horst | A22B 3/086 452/58 |
| 7,244,172 B2 * | 7/2007 | Horst | A22B 3/06 452/58 |
| 7,588,486 B2 | 9/2009 | Horst et al. | |
| 8,506,366 B2 | 8/2013 | Ralph et al. | |
| 8,568,207 B1 | 10/2013 | Summerfield et al. | |
| 8,894,474 B2 | 11/2014 | Ralph et al. | |
| 2013/0130604 A1 | 5/2013 | Ralph et al. | |
| 2013/0324023 A1 | 12/2013 | Ralph et al. | |

FOREIGN PATENT DOCUMENTS

| | | |
|---|---|---|
| JP | 09140324 A | 6/1997 |
| WO | 2011137497 A1 | 11/2011 |
| WO | 2014066953 A1 | 5/2014 |

OTHER PUBLICATIONS

PCT International Search Report, PCT/AU2013/001271, dated Jan. 8, 2014.

Small et al., Electronmagnetic induction of insensibility in animals: a review, Animal Welfare, 2013, pp. 287-290, vol. 22, Universities for Animal Welfare.

* cited by examiner

EFFECTIVE ANIMAL STUNNING

CROSS-REFERENCE TO PRIOR APPLICATIONS

This application is a national phase entry under 35 U.S.C. §371 of International Patent Application PCT/AU2013/001271, filed Nov. 4, 2013, designating the United States of America and published in English as International Patent Publication WO 2014/066953 A1 on May 8, 2014, which claims Convention priority from U.S. patent application Ser. No. 13/668,030, filed Nov. 2, 2012, now U.S. Pat. No. 8,506,355, issued Aug. 13, 2013, the disclosure of each of which is hereby incorporated herein in its entirety by this reference.

TECHNICAL FIELD

This disclosure relates to methods and apparatus for stunning of animals to induce unconsciousness and insensibility enabling processing or handling of the animal.

BACKGROUND

In slaughtering a live animal in an abattoir for production of meat, hide, and other by-products, the animal is usually restrained and then stunned to induce immediate unconsciousness and insensibility. The slaughter can then be performed without avoidable fear, anxiety, pain, suffering and distress. The stunning can also help avoid difficulties and dangers for persons involved in the processing and handling operations.

The "stunning" is commonly carried out either by an mechanical process, such as applying concussion by means of a projectile captive bolt (penetrating or non-penetrating mushroom headed knocker) impacted against the skull of the animal, or by electrical current applied to the animal and passed through the brain, or by inhalation of gases such as carbon dioxide, nitrogen or argon.

The terms "stun" or "stunning" are frequently used to refer to irreversible processes, i.e., the "stunning" process causes irreversible damage to the animal, particularly the brain. This may not be a difficult or contentious issue with regard to animal welfare concerns because the slaughter, such as by sticking and exsanguination, immediately follows the stunning and is, therefore, performed on an irreversibly unconscious and insensible animal.

However, with religious slaughter or ritual slaughter, irreversible stunning is not acceptable. The animal must not be injured or harmed prior to exsanguination. For example, with the Muslim slaughter method or "Halal slaughter," the animal is required to be alive at the time of slaughter. This requirement does not necessarily mean that the animal is not permitted to be first stunned prior to slaughter, as long as there is no injury, e.g., significant damage to the skull, but irreversible stunning may well be unacceptable to comply with the dictated ritual requirements. Likewise with the Jewish or Judaic slaughter method or "Shechita," post-cut stunning of the animal may be permissible, but not irreversible pre-cut stunning that may be deemed unacceptable so that the resulting carcass would not be Kosher.

There have been some references in the published patent literature to use of microwave radiation stunning of animals for slaughter.

U.S. Pat. No. 3,973,290 refers to stunning an animal for slaughter by applying microwave energy to penetrate the animal's skull and heat the brain. A microwave beam is proposed to be directed at the animal without restraining it, the energy being applied from the side of the skull. Such methods of application would create considerable surrounding tissue damage by largely indiscriminate heating and, therefore, would be an irreversible process, causing harm to the animal, and is likely to be inhumane.

U.S. Pat. No. 4,616,160 describes a microwave heating apparatus for irradiating the entire head of test animals, particularly rodents. The configuration of the apparatus including the manner of coupling the microwave energy to the animal will heat the entire head of the animal. The specification does not explain whether the purpose is to stun the animal but, if so, many organs and tissues of the head are likely to be damaged and the apparatus would, therefore, be unacceptable from the point of view of animal welfare.

DE 4116670 describes and illustrates an apparatus for irradiating a pig with multiple microwave applicators arranged around the head and in a row along the length of the spine, all being spaced from the animal. Use of such an apparatus design will irreversibly damage tissues by cooking affected tissues, which is likely to be inhumane.

JP 3039615 describes apparatus for slaughtering animals using microwaves to heat the brain causing cerebral death.

WO2011/137497 describes an animal stunning apparatus and method for inducing rapid unconsciousness and insensibility. The apparatus includes a stunning station in which a live subject animal is located in a confined position and an applicator contacts an application point on the live subject animal's head immediately overlying a frontal portion of the animal's brain and couples microwave radiation to the head. A microwave generator generates microwave energy of a suitable power level and frequency, and a waveguide directs the microwave radiation to the applicator. A switch discontinues the application of microwave radiation effecting heating of the frontal portion of the brain after a period of time sufficient to have raised the temperature of the frontal portion of the brain of the subject animal to thereby induce the unconsciousness and insensibility. The period is sufficient only to rapidly induce insensibility, and is insufficient for the insensibility induced to be irreversible, and insufficient to cause significant heating of deeper brain tissues, including the brain stem. This system is owned by the present applicant and testing and development of this system revealed significant and unexpected difficulties in achieving consistent results for the animal stunning, making the system unsatisfactory commercially and/or for animal welfare.

The above references to and descriptions of prior proposals or products are not intended to be, and are not to be construed as, statements or admissions of common general knowledge in the art in Australia or elsewhere. None are known to have ever been commercially used.

BRIEF SUMMARY

It is an object of the present disclosure to provide processes and apparatus for stunning of animals to effectively and more consistently induce unconsciousness and insensibility.

It is a particular preferred object to provide processes and apparatus capable of stunning of animals to induce rapid unconsciousness and insensibility in an effective and controlled manner that the stun is reversible, meaning that the animal can later regain consciousness and sensibility without significant loss of brain-mediated function including motor functions, sensory processing, innate and instinctive functioning, learned behavior, etc. With such reversible animal stunning processes and apparatus, animals for slaughter can be stunned in a manner to enable subsequent processing and handling, including slaughter, while the system still remains compliant with certain religious slaughter rituals. The achievement of reversible stunning processes and apparatus may also enable such stunning of animals for other kinds of processing or handling, such as for veterinary inspections or purposes, banding, branding, tagging, inspection recording and re-release, etc. However, the particular processes and apparatus described herein will refer to the primary intended field of application, namely slaughtering of animals for food production, hide recovery and treatment, and other by-product extraction and processing.

According to the first aspect of the present disclosure, there is provided a method of stunning an animal for inducing unconsciousness and insensibility enabling processing or handling of the animal, the method including the steps of:

introducing a live subject animal to be processed or handled to a stunning station and locating the animal in a generally confined position, locating an applicator in contact with an application point on the animal's head immediately overlying the frontal portion of the subject animal's brain, the applicator having a coupling conformation to couple microwave radiation through the applicator to the head and to the frontal portion of the brain of the subject animal, generating microwave radiation of a suitable power level and frequency and directing that radiation through a waveguide to the applicator at an operative end of the waveguide to thereby heat the frontal portion of the brain of the subject animal, detecting reflected power of microwave radiation in the waveguide and, in response to the level of reflected power, tuning the waveguide so as to reduce the reflected power being detected by changing the impedance of the waveguide and applicator to better match the impedance of the head and thereby increase the transfer of microwave power to the head, and continuing the application of the microwave radiation to effect the heating for a period of time to raise the temperature of the frontal portion of the brain, the period being sufficient to induce insensibility.

For compliance with ritual slaughter criteria, the switch can be operable to discontinue the application of microwave radiation immediately after a period that is sufficient only to rapidly induce insensibility, and insufficient (i) for the insensibility induced to be irreversible, and (ii) to cause significant heating of deeper brain tissues, including the brain stem.

Preferably, the application point is medially located on the head of the subject animal above a line extending between the animal's eyes so as to be located at the closest external point to the central and frontal portion of the brain. Preferably the frontal portion of the brain of the subject animal is heated to satisfy at least one of the conditions: the temperature increases by an amount in the range of about 5° C. to about 10° C., and the temperature increases to about 43° C.

In a particular preferred embodiment, a period of time during which application of the microwave radiation is continued and during which the tuning is continually performed is terminated after a period for an effective power transfer defined as sufficient to achieve an effective syncope of the animal, the effective power transfer being determined as a function of power transferred to the animal and excluding reflected power. In this embodiment, the method preferably includes the steps of measuring continually the power of microwave radiation being reflected, and determining from the power generated by the microwave generator and from the measured reflected power the actual power being transferred from the applicator.

In one possible method according to this preferred embodiment, the effective power transfer is reached by applying microwave power for a predetermined time period, which is started only after the power being transferred through the applicator is determined to have reached a predetermined level. In an alternative method, the effective power transfer is reached by applying microwave power for a time period sufficient for the sum of the determined power levels being transferred through the applicator for a plurality of time increments to reach a predetermined sum.

The detection of microwave radiation reflected in the waveguide is preferably performed using a directional coupler associated with the waveguide and operable to measure the complex reflection coefficient of the load, thereby enabling determination in real time of the power being transferred through the applicator.

For enabling monitoring of the effective power transfer and visual assessment of an effective syncope, the method preferably further includes the step of visually displaying the microwave power being generated by the microwave generator during the stunning operation, the microwave power being detected as reflected within the waveguide and arising from the degree of the impedance matching with the head, and the power determined from the generated and reflected power as being transferred through the applicator throughout the stunning operation.

The method also preferably further includes the step of continually logging the microwave power being generated by the microwave generator during the stunning operation, the microwave power being detected as reflected within the waveguide and arising from the degree of the impedance matching with the head, and the power determined from the generated and reflected power as being transferred through the applicator throughout the stunning operation so as to provide a stored record of parameters of the stunning operation for subsequent analysis for regulatory compliance, process research, and operation management purposes.

According to a second aspect of the disclosure, there is provided an animal stunning apparatus for inducing substantially immediate unconsciousness and insensibility, enabling processing or handling of a subject animal, the apparatus including:

a stunning station to which a live subject animal to be processed or handled is introduced, the stunning station being arranged to locate the subject animal in a confined position;

an applicator located so as to contact an application point on the live subject animal's head immediately overlying a frontal portion of the animal's brain, the applicator having a coupling conformation to couple microwave radiation therethrough to the head and to the frontal portion of the brain of the subject animal when in the confined position at the stunning station;

a microwave generator for generating and radiating microwave energy of a suitable power level and frequency;

a waveguide coupled to the generator so as to receive and direct the microwave radiation to the applicator located at an operative end of the waveguide so as to thereby heat the frontal portion of the brain of the subject animal beneath the application point that the applicator contacts in use; and a switch operable so as to discontinue the application of microwave radiation effecting heating of the frontal portion of the brain after a period of time sufficient to have raised the temperature of the frontal portion of the brain of the subject animal to thereby induce the unconsciousness and insensibility, and wherein the apparatus further includes an auto-tuner operatively associated with the waveguide and that detects reflected power of microwave radiation in the waveguide resulting from the degree of the impedance matching between the applicator and the head and that tunes the waveguide to reduce the reflected power and increase the transfer of the microwave power to the head.

Preferably, the auto-tuner is operable in an iterative manner to continually tune the waveguide during the application of microwave radiation so as to continually improve or maintain impedance matching while the impedance of the head changes due to heating.

In a preferred embodiment of the apparatus, the applicator has an opening therein through which the microwave radiation from the waveguide is coupled to the animal's head at the application point, the peripheral portions of the applicator defining the opening contacting the animal's head to surround the application point when the applicator is in its operative position. Preferably, the peripheral portions of the applicator are yieldable so as to conform in shape to the shape of the animal's head at the application point upon relative operative positioning of the applicator at the application point. The peripheral portions of the applicator are preferably flexible so as to yield and conform to the surface shape of the animal's head at the application point, the flexible peripheral portions of the applicator being impermeable to microwave radiation.

In one possible construction, the peripheral portions of the applicator defining the opening are composed of metallic braid so as to be flexible to conform to the surface shape, to be impermeable to microwave radiation, and to be resilient to substantially return to an initial state after the removal of the applicator from the application point.

Alternatively or in addition to a yieldable peripheral portion at the opening, the waveguide or applicator may include a movable joint enabling limited movement of the applicator to improve contact of the peripheral portions of the applicator defining the opening for different relative positions and conformations of the animal's head and to limit microwave leakage at the application point. In this construction, the movable joint may enable limited movement of the applicator about two orthogonal axes, which are generally parallel to the surface of the animal's head at the application point where the animal's head is presented for contact with the applicator.

The apparatus may further include a head detector switch mounted by the applicator and operable to switch its state only upon achievement of positive sealing contact of the applicator with the animal's head at the application point. The switch may be operable to changes its state only upon deformation of the flexible peripheral portions of the applicator defining the opening being flexed to an extent achieved when close contact of the applicator with the surface of the animal's head at the application point has been achieved, the switch being connected in a circuit preventing commencement of application of microwaves to the animal's head until the switch has changed its state, indicative of effective sealing contact of the applicator with the animal's head.

BRIEF DESCRIPTION OF THE DRAWINGS

Possible and preferred features of the present disclosure will now be described with particular reference to the accompanying drawings. However, it is to be understood that the features illustrated in and described with reference to the drawings are not to be construed as limiting on the scope of the disclosure. In the drawings.

DETAILED DESCRIPTION

Figure 1:
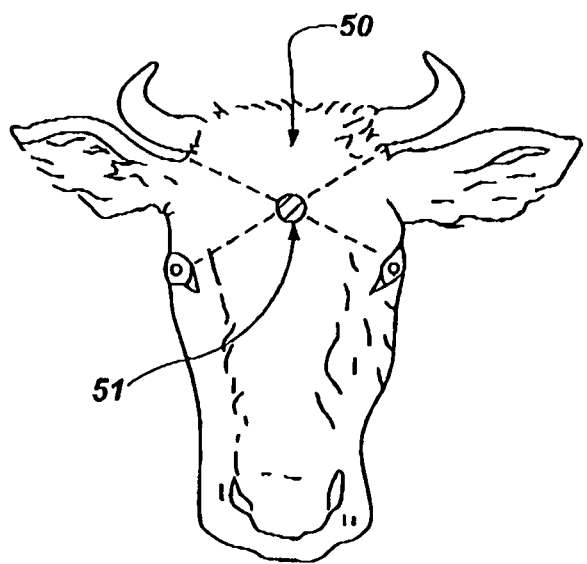
FIG. 1 is an illustration of a cattle head with the application point for the microwave radiation indicated.
Figure 2:
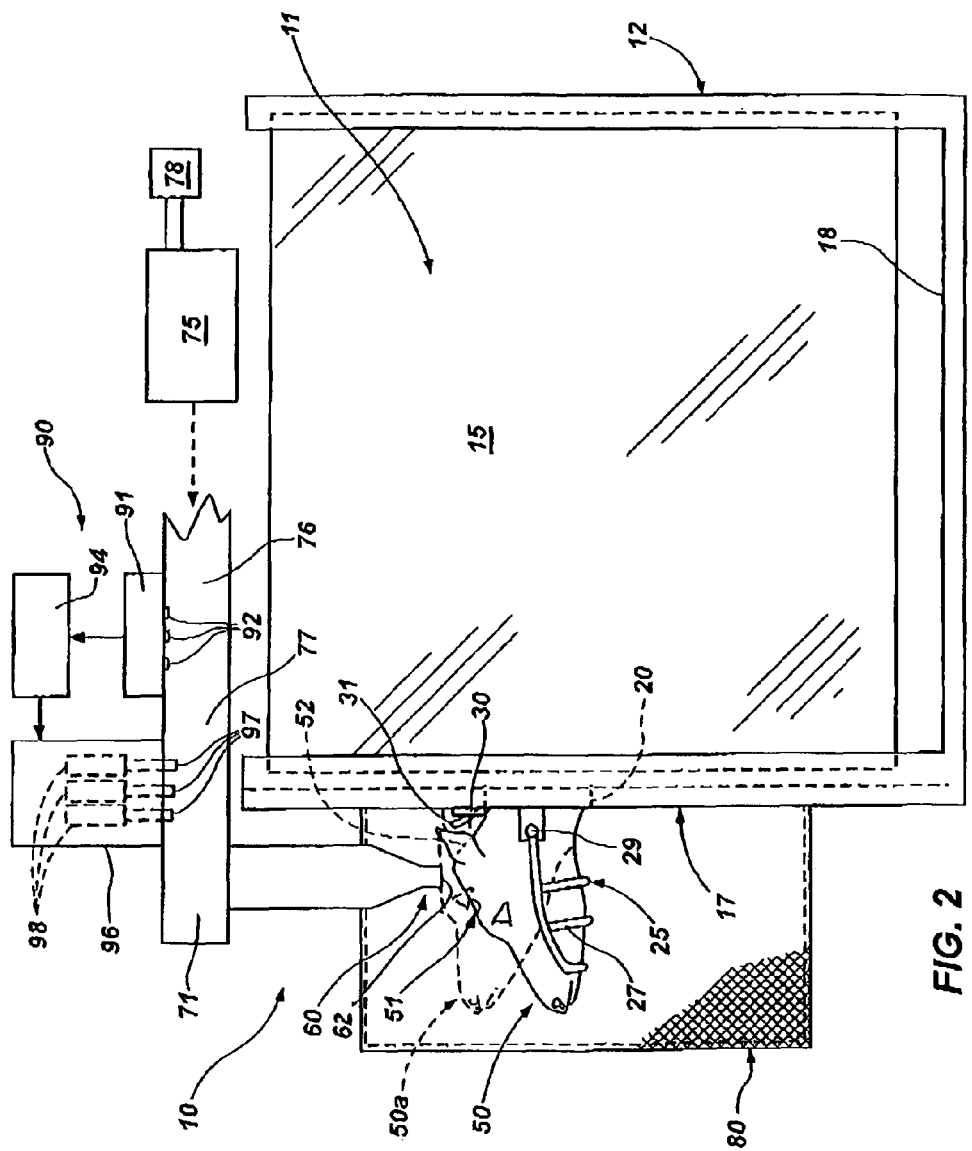
FIG. 2 schematically illustrates in side view an animal stunning station with stunning apparatus according to one embodiment of the disclosure.

The illustrated apparatus of FIG. 2 is mostly the same as that described and illustrated in the applicant's specification WO2011/137497 and reference may be made to that specification for more detail than described here. In summary, however, the apparatus includes an animal stunning station 10, which includes an enclosure 11 or crush. The animal is introduced into the enclosure through entrance 12 and confined therein between the entrance 12, which has a door that closes behind the animal. An opening 20 at the head end 17 of the enclosure 11 enables the animal to place its head 50 through the opening. The stunning station 10 includes head positioning means 25 to locate and present the animal's head 50 in a defined position to the microwave applicator 60. The applicator point 51 where the microwave radiation is to be applied by the applicator 60 is, as shown in FIG. 1, medially located on the head above a line extending between the animal's eyes so as to be located at the external point closest to the central frontal portion of the brain.

Figure 3:
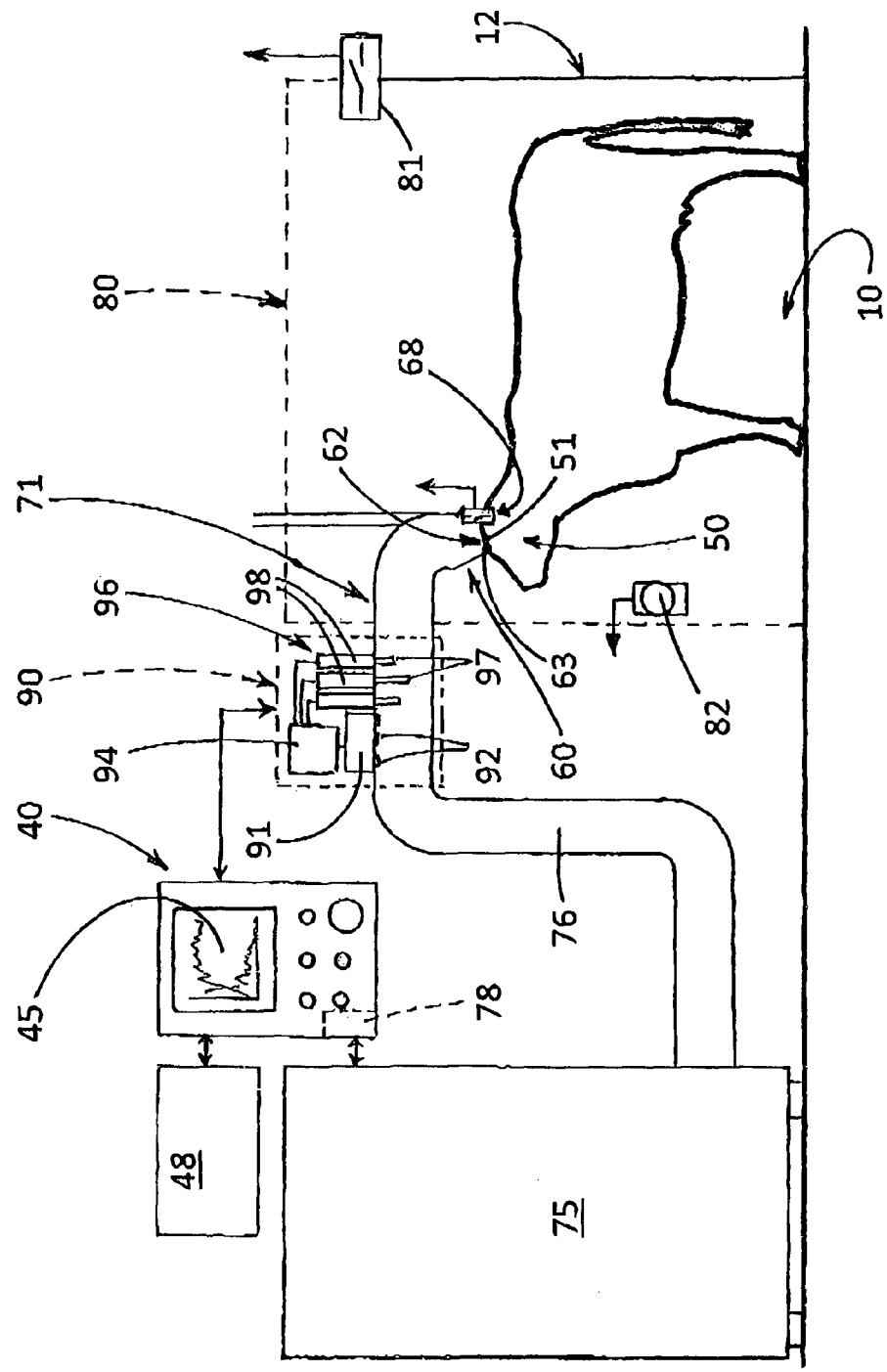
FIG. 3 schematically illustrates in side view an animal stunning station with stunning apparatus according to a second embodiment of the disclosure.

The embodiment of FIG. 3 will include the same or similar elements to locate, restrain, and support the animal, but to simplify the drawing these are not illustrated.

The stunning station in the illustrated apparatus of FIGS. 2 and 3 locates the animal in the confined position so that the applicator 60 can contact the application point 51 immediately overlying a frontal portion of the animal's brain. The applicator 60 has a coupling conformation 61 to couple microwave radiation therethrough to the head 50 of the animal. A microwave generator 75 generates and radiates microwave energy of a suitable power level and frequency. Waveguide 76 is coupled to the generator so as to receive and direct the microwave radiation to the applicator 60 located at an operative end 77 of the waveguide. Switching means 78 (schematically shown in FIG. 2 and being part of the controller 40 in FIG. 3) is operable to discontinue the application of microwave radiation effecting the heating of the frontal portion of the brain after a period of time sufficient to raise the temperature of the frontal portion of the brain of the animal to thereby induce unconsciousness and insensibility or syncope.

If the animal is to be stunned for ritual slaughter requiring the animal to be alive, or if the animal is to be held insensible for a time, e.g., for performing veterinary tests or processes, after which the animal is to be returned to its normal sensible and conscious condition by allowing the temperature of the front portion of the brain to return to normal, the switching means 78 is operable to discontinue the application of microwave radiation immediately after a period that is:

sufficient only to rapidly induce insensibility and insufficient (i) for the insensibility induced to be irreversible, and
(ii) to cause significant heating of the brain tissues, including the brain stem.

FIGS. 2 and 3 schematically illustrate the waveguide 76 provided with an associated auto-tuner 90 to improve the tuning efficiency and effectiveness between different animals being processed and to enable adjustment of the tuning as the dielectric properties of the animal's head changes with temperature. As the research has discovered, animal heads have different impedances, with numerous variables affecting that property, such as animal breed, age, sex, physical features of individual animals such as different tissue thicknesses and compositions (bone, muscle, fat, hide, etc.), different shapes of head, different surface features and surface materials (fur, wool, hair), different temperatures (at the start and during microwave application), and moisture content. Tuning of the impedance of the waveguide and applicator to each animal head as it is presented has been conceived and found to be beneficial.

The auto-tuner 90 in FIG. 2 includes a directional coupler 91 mounted to and operatively associated with the waveguide 76. The directional coupler 91 associated with the waveguide is operable to measure the complex reflection coefficient of the load, thereby enabling determination in real time of the power being transferred through the applicator 60. For example, the coupler samples the standing wave in the waveguide, e.g., by providing probes 92 at spaced points lengthwise of the waveguide, optimally at 60° intervals of the guide wavelength. The coupler 91 provides data signals to the processor 94, which can be constructed or programmed to analyze the signals from the coupler 91 and to determine forward and reflected power levels. A target reflected power level may be programmed for the apparatus to achieve by tuning of the waveguide. Effectively, the coupler 91 and associated processor 94 are determining the impedance by determining the complex reflection co-efficient of the microwave load (i.e., the head 50).

The apparatus also includes a tuner 96 associated with the waveguide 76, which is responsive to the processor 94. The tuner may, for example, comprise movable members 97 having associated drives 98 so that, in response to command signals from the processor 94, the drives 98 move the respective positions of the members 97 within the waveguide 76, thereby altering the impedance characteristics of the waveguide. The direction and extent of the movements of the members 97 are controlled by the processor so as to adjust the impedance of the waveguide in a manner to reduce the reflected power toward the programmed target and that will indicate improved effective coupling of the microwaves to the head 50.

Each animal head 50 has a different impedance, e.g., due to differences in the sizes and composition of the heads, and due to the positions of the heads in relation to the applicator 60. As soon as power is applied, the auto-tuner 90 begins analyzing the impedance and adjusting the tuner 96 so as to improve the impedance matching between the waveguide 76 and applicator 60 and the load, i.e., the head 50. As the application of microwave radiation to the head 50 occurs and warming of the head and frontal brain tissues begins, the impedance of the head 50 will change. Therefore, the auto-tuner 90 is operative to continually monitor the reflected power and to automatically adjust the tuner 96 and maintain or improve the power coupling to the head 50. Thus, by automatic impedance matching between the waveguide and applicator and the head at the commencement of the stunning operation, and by continually monitoring and auto-tuning of the waveguide in an iterative manner to maintain impedance matching, the rate of heating of the animal head 50 and particularly of the frontal brain region, can be increased, thus decreasing the duration of the heating time necessary to induce unconsciousness and insensibility.

Referring to the embodiment of FIG. 3, the same reference numerals are used for the same components as FIG. 2. However, in this embodiment, a supervisory controller 40 is incorporated to significantly improve the effectiveness of the animal stunning operations. A function of the controller 40 is to determine the period of time during which application of the microwave radiation is continued and during which the tuning is continually performed by the auto-tuner 90 after there has been an effective power transfer defined as sufficient to achieve an effective syncope of the animal. In particular, the effective power transfer is determined by a function of power transferred to the animal and excluding reflected power. The data from the directional coupler 91 and the processor 94 enable the power of microwave radiation being reflected to be measured continually, and from the power generated by the microwave generator 75 and from the measured reflected power, the actual power being transferred from the applicator 60 can be determined by the processor 94 or by the controller 40, which receives data continually from the auto-tuner 90.

Figure 5:
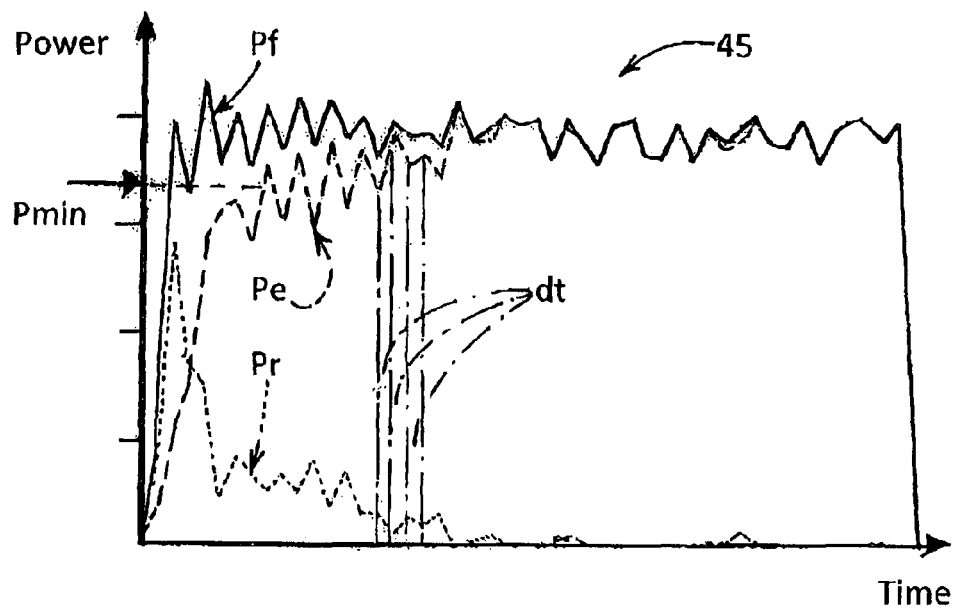
FIG. 5 is a view of a graphical display at the control station enabling viewing of parameters to ensure effective stunning.

As shown in FIG. 5, a graphical display 45 is provided at the control station where the controller 40 is located, the display enabling viewing of parameters to ensure effective stunning. In FIG. 5, the display is a plot generated in real time of power as a function of time. There are three superimposed plots:

forward power "Pf" representing the microwave power detected by the directional coupler 91 being generated and transferred by the waveguide, reflected power "Pr" representing the microwave power detected by the directional coupler 91 being reflected within the waveguide, primarily arising from impedance mismatch with the load, and transferred power "Pe," which substantially equates to the power being absorbed by the load (if there is little leakage of microwave power at the application point) and which can be computed as the difference between the forward or generated power and the reflected power.

It can be seen that the reflected power Pr falls to zero only after a period of time as the auto-tuner proceeds to match the impedances of the waveguide and applicator with the load (animal's head). The time taken to fall to zero is desirably minimized but without prejudice to the achievement of an effective stun, so the period of effective application of microwave power is not solely a function of time that the generator is operating. The curve Pe is more significant in determining effectiveness.

In order for the process and apparatus to ensure the effective power transfer defined as sufficient to achieve an effective syncope of the animal is reached, the controller in one embodiment applies microwave power for a predetermined time period, which is started only after the power being transferred through the applicator 60 is determined to have reached a predetermined level. This is shown in FIG. 5 by the level marked "Pmin," which can be the power level that the Pe measurement must reach before the timer starts.

In an alternative possible embodiment, in order for the process and apparatus to ensure the effective power transfer defined as sufficient to achieve an effective syncope of the animal is reached, the controller 40 applies microwave power for a time period sufficient for the sum of the determined power levels Pe being transferred through the applicator 60 for a plurality of time increments dt to reach a predetermined sum. Effectively, the controller is computing in real time an integral representing the area under the plot of the Pe level, which can provide a more accurate measure of power absorbed by the load 50 than, say, the crude power generated by the microwave generator 75 or the forward power Pf. When a predetermined sum or value of the integral is reached, the application of power is stopped.

By visually displaying during the stunning operation the microwave power Pf being generated by the microwave generator 75, the microwave power Pr being detected as reflected within the waveguide 76 and arising from the degree of the impedance matching with the head 50, and the power Pe determined from the generated and reflected power as being transferred through the applicator 60 throughout the stunning operation, monitoring of the effective power transfer and visual assessment of an effective syncope are possible.

The system in FIG. 3 includes a memory or storage 48 in which the controller 40 continually logs during the stunning operation (1) the microwave power Pf being generated by the microwave generator 75 and transmitting through the waveguide 76, (2) the microwave power Pr being detected as reflected within the waveguide 76 and arising from the degree of the impedance matching with the head 50, and (3) the power Pe determined from the generated and reflected power as being transferred through the applicator 60 throughout the stunning operation so as to provide a stored record of parameters of the stunning operation for subsequent analysis for regulatory compliance, process research, and operation management purposes.

Other data will also be recorded and stored in a functioning installation such as individual animal identification associated with the respective log of a stun performed. Data display and logging can also include, for example, the complex reflection coefficient displayed in various formats, including magnitude, phase, return loss, VSWR, polar display, as well as measurements of incident, reflected and absorbed power. Other process data and apparatus operational data will also be stored, together with operator information and recordable comments for later regulatory compliance assessment, system maintenance and operation review, process refinement and development, etc. These functions are known for industrial control systems such as SCADA (supervisory control and data acquisition) systems. Such SCADA systems have HMI (human machine interfaces) that present processed data to a human operator and through which the operator monitors and controls the stunning processes.

Auto-tuners suitable for use in the apparatus of the present disclosure may be composed of a "Homer Analyzer" (an automatic impedance and power measurement system) such as the Homer Autotuner Stolpa, Model STHT v2,3, from S-TEAM Lab, Slovak Republic, which is operatively coupled to a motorized tuner such as one obtained from, or analogous to those made by, Muegge GmbH (Reichelsheim, Germany).

In FIGS. 2 and 3, the applicator 60 is illustrated without detail of its construction and configuration. However, it has an opening 62 through which the microwave radiation from the waveguide 76 is coupled to the animal's head 50 at the application point 51. There are peripheral portions of the applicator defining the opening 62 that contact the animal's head so as to surround the application point 51 when the applicator 60 is in its operative position. The configuration of the opening 62 is chosen with consideration to providing impedance matching between the impedance of the applicator 60 and the tissues at the application point 51. The area bounded by the peripheral portions 63 are composed of shielding material, typically metal, to provide power transfer to the animal tissues without microwave leakage.

Figure 4:
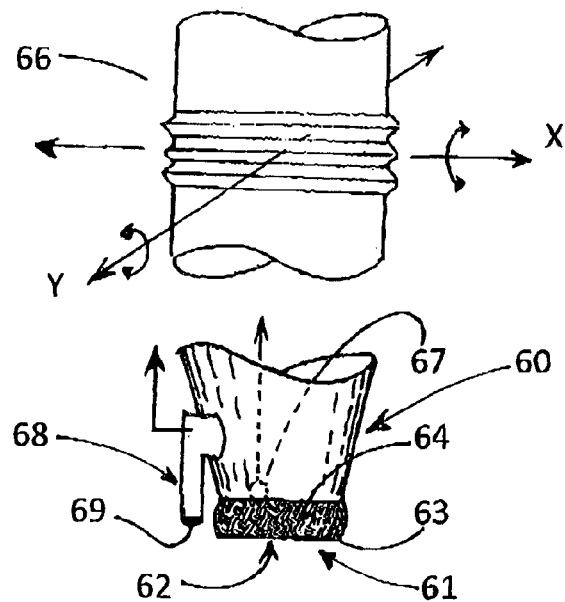
FIG. 4 is a detailed side view of the outlet end of a microwave applicator, which is applied to the animal's head.

In WO2011/137497, FIG. 4, the peripheral portions 63 are composed of shielding material and are configured so as to project slightly beyond the opening 62 so that they press into the surface tissues of the animal, typically by about 1 to 2 mm, with the aim of achieving good coupling and microwave energy transfer without leakage and also to resist transverse movement of the applicator 60 if the animal attempts to move its head particularly generally in the plane of the opening 62. However, the considerable variability of animal head conformations has been found to enable microwave leakage even with a firm pressure of the applicator against the animals' heads.

The applicator 60 shown in the present FIG. 4 comprises peripheral portions 63 surrounding the opening 62 of the applicator 60, which are yieldable so as to conform in shape to the shape of the animal's head at the application point upon relative operative positioning of the applicator 60 at the application point. In the illustrated embodiment, the peripheral portions 63 of the applicator are flexible so as to yield and conform to the surface shape of the animal's head at the application point, the flexible peripheral portions of the applicator being impermeable to microwave radiation.

In the embodiment of FIG. 4, the peripheral portions 63 of the applicator 60 defining the opening 61 are composed of metallic braid so as to be flexible to conform to the surface shape, so as to be impermeable to microwave radiation, and so as to be resilient to substantially return to an initial state after the removal of the applicator from the application point. The braid 64 may be wound around a resilient core such as a resilient rubber or polymer tube, like a pressure hose used, for example, in pneumatic or hydraulic applications. Other constructions of the peripheral portions 63 of the applicator 60 are possible, such as a flexible metallic foil skirt, or a mesh that is flexible or deformable and surrounds the opening 62.

In addition to, or as an alternative to, the flexible peripheral portions 63 surrounding the opening 62, the waveguide 76 or applicator 60 can include a movable joint 66 enabling limited movement of the applicator to improve contact of the peripheral portions 63 of the applicator defining the opening 62 for different relative positions and conformations of the animal's head and to limit microwave leakage at the application point. As illustrated in FIG. 4, for example, the movable joint 66 can be constructed and operable to enable limited movement of the applicator about two orthogonal axes X and Y, which in use, are generally parallel to the surface of the animal's head at the application point where the animal's head is presented for contact with the applicator. The particular joint 66 shown resembles a concertina formation of a section of the passage of the waveguide or applicator, but other joint constructions are possible.

The apparatus in FIGS. 3 and 4 shows the provision of a head detector switch 68 mounted near, e.g., mounted by, the applicator 60 and operable to switch its state only upon achievement of positive contact of the applicator 60 with the animal's head 50 at the application point 51. Initially, the switch 68 can function to stop operation of the mechanism used to relatively raise the animal's head to the applicator 60 before the stunning operation. However, the switch 68 can also serve to switch its state only upon achievement of positive sealing contact of the applicator with the animal's head sufficient to minimize or prevent microwave leakage at the application point. In particular, the switch 68 can be positioned so that its extremity 69, which is pressed to change the state of the switch, requires deformation of the flexible peripheral portions 63 of the applicator 60 defining the opening 62 to an extent achieved when close contact of the applicator with the surface of the animal's head at the application point has been achieved. The switch 68 is connected in a circuit of the controller 40, which prevents commencement of application of microwaves to the animal's head until the switch has changed its state indicative of effective sealing contact of the applicator with the animal's head.

A further enhancement of the apparatus to help ensure sealing of the applicator 60 to the surface of the animal's head 50 at the application point 51 so as the minimize the leakage of microwave radiation at that point, is the provision of a light sensor 67 illustrated schematically in FIG. 4 located within or close to the opening 62 and operative to detect any significant light entering the opening around the peripheral portion 63. Such light entry would indicate that a suitable seal of the applicator against the animal's head against microwave leakage may not be achieved. The controller 40 can be connected to the light sensor 67 similarly to the head detector switch 68 to prevent microwave application if there is likely to be a microwave leakage as indicated by the light detection.

As shown in FIG. 2, the stunning station 10 includes a microwave shielding 80 surrounding at least the position of the animal head 50 when the animal is in its confined position. The shielding 80 forms a Faraday cage for limiting or preventing leakage of microwave radiation. The animal's head 50 in use extends through the opening 20, which constitutes an opening into the Faraday cage. The head end 17, particularly the panels 21, 22, effectively form part of the Faraday cage. In FIG. 3, the shielding 80 forming the Faraday cage surrounds the entire stunning station 10 and includes the access door 12, which has an associated system safety switch 81 that must be closed (indicating complete closure of the Faraday cage) before the controller can activate the stunning cycle. An emergency stop switch 82 is located inside the Faraday cage for use if a person is ever inadvertently inside the cage when microwave generation starts or is about to be started. Other safety features can include warning lights on the generator and on the cage that brightly flash to alert operators when microwaves are being generated. A microwave radiation detector outside the cage can shut down the generator if it detects radiation indicating the Faraday cage is leaking. An exhaust shown in FIG. 3 extends from the vicinity of the location of the animal head to extract steam and dust away from the applicator. A quartz window can be installed inside the waveguide between the auto-tuner and the applicator to protect the auto-tuner and magnetron from dust and unlikely plasma formation. Water cooling systems are associated with the generator and the auto-tuner. An arc detector can be installed inside the waveguide to shut off the generator if it detects plasma or arc formation.

An operator stationed at the controller 40 can receive all system data and information enabling monitoring and control of the stunning operations. The system monitoring includes verification that the animal has been loaded into the cage and applicator positioned so the head proximity switch has switched states, and the Faraday cage door switch indicates door closure. The operator can then perform a visual inspection to ensure no personnel are in the cage and the animal head is correctly positioned. The information about each animal presented can be used by the operator to set the stun parameters, particularly the time and/or power of microwave application. This can be an "effective" time that the controller then adjusts automatically as described earlier to allow for auto-tuner delay in impedance matching. The apparatus may also include an automatic timer control (not shown) to start and terminate the application of microwave radiation to the animal head depending on programmed criteria. For example, the knocking box may include an animal weight sensor, the output of which is fed to the timer control, which is taken into account in determining the necessary period for the application of microwaves according to an algorithm or formula.

The microwave generator 75 may be generally conventional in construction and operation. The frequency of the microwave radiation generated and transmitted through the associated waveguide may be any suitable value. Tests involving the application of microwave radiation to cattle and sheep heads have utilized microwave generators operating at frequencies commercially utilized in Australia, namely 922 MHz and 2.45 GHz. These tests demonstrated that with the lower frequency 922 MHz, there is better penetration of the energy and less unwanted heating of tissues at the surface and in surrounding tissues, so such a lower frequency is preferred. Other countries use different microwave frequencies, e.g., 896 MHz in UK and 915 MHz in US. These would be effective also. The optimum frequency or frequency range can be determined empirically and is believed to be in the range 500 MHz-1 GHz.

WO2011/137497 describes considerations regarding the power requirements of the microwave generator and aspects of the modes of microwave radiation being generated and used, and reference may be made to that specification for additional data.

Preferably, the temperature rise of the frontal portion of the brain to induce reversible unconsciousness and insensibility is in the range of about 5° C. to less than about 10° C. For example, tests with live (anesthetized) sheep showed frontal brain heating to about 43° C. produced electroencephalogram (EEG) traces similar to those observed with electric stunning now widely used in abattoirs, thus indicating that that temperature would achieve unconsciousness and insensibility. However, heating to about 50° C. or more would start to produce protein denaturation and, hence, permanent tissue damage.

Upon the application of the microwave energy and achievement of the required degree of heating, the generation of microwave energy is preferably switched off (or otherwise stopped from application to the animal) so as to prevent further heating, particularly if the stun is to be deemed reversible. Timely discontinuance of the application of microwave energy limits or prevents heating of deeper tissues, particularly the brain stem, to any significant extent, particularly heating to cause irreversible effects. In particular, heating of the mid and deep brain tissues, and particularly the brain stem area (which controls cardiac and respiratory functions), to the same extent as the frontal portion is undesirable, because it may cause immediate effects, such as heart failure, which may then lead to the stun and subsequent slaughter being deemed non-compliant with the religious ritual slaughter criteria, the animal carcass being rejected as unacceptable for the intended consumption by the relevant religious group, with consequent devaluation of the carcass and its meat. In the case of sheep, brain stem heating should be limited to maintain the brain stem temperature to less than about 43° C.

Confinement of the major heating effect to the frontal portion of the animal brain in the process and apparatus of the present disclosure is required to render the induced insensibility reversible. The frontal portion of the brain is involved in cognitive, perception, sensory, and consciousness brain functioning or processes so that warming of this portion of the brain by the extent indicated, leads to unconsciousness and insensibility but without causing irreversible damage to the brain tissues and brain functioning if the elevated temperature does not exceed 50° C.

However, although particularly developed and described herein in relation to reversible stunning for ritual slaughter, the apparatus and method may be useful for other processes requiring reversible insensibility. Examples may include veterinary procedures in which temporary insensibility is required or useful. To avoid the animal regaining consciousness, the microwave radiation may be applied in pulses or intermittently to maintain unconsciousness without permanent damage or other undesired effects. Analogously, the apparatus and method may be useful for other animal processes or treatments or inspections, e.g., docking, tagging, branding, and inspections generally.

Because stunning using this apparatus and process can produce insensibility or unconsciousness in a manner without excessive stress and pain, the disclosure can be extended for use as a permanent or irreversible stunning or killing system. By increasing the power or duration of the application of microwaves, the increased heating effect and/or deeper brain heating can enable a useful alternative to current irreversible electrical or percussive stunning of animals for slaughter.

It will be seen that the process and apparatus according to the preferred embodiments described herein, including those described in relation to the drawings, can enable stunning of animals, particularly animals for slaughter, so as to rapidly induce unconsciousness and insensibility, enabling further processing or handling, including slaughter in a manner compliant with religious ritual criteria or handling for temporary processes, such as veterinary, because the stun is reversible. The stun also is carried out in a way that complies with good animal welfare handling practices. Indeed, the disclosed method and apparatus are potentially capable of being better than current practices, particularly relating to animal welfare outcomes. For example, success rates for rapid and reliable stunning may be better, there may be less risk of operator error, and there may be less stress to animals. The present disclosure provides a combination of processes and constructions and operations of apparatus that individually and cumulatively enhance substantially the effective microwave coupling and energy transfer to the animal's head, so that stun time can be minimized with great benefits in animal welfare, worker health and safety, process monitoring and recording for regulatory and commercial purposes.

The invention claimed is:

1. An animal stunning apparatus for inducing unconsciousness and insensibility of a live subject animal, the apparatus comprising:
  an applicator relatively movable in relation to the live subject animal's head for bringing the applicator into contact with an application point defined on the animal's head overlying a frontal portion of the animal's brain, the applicator having a coupling conformation to couple microwave radiation therethrough to the head and to the frontal portion of the brain of the subject animal when in contact with the application point on the animal's head;
  a microwave generator for generating and radiating microwave energy of a suitable power level and frequency;
  a waveguide located to receive and direct the microwave radiation from the generator to the applicator located at an operative end of the waveguide to heat the frontal portion of the brain of the subject animal beneath the application point which the applicator contacts in use;
  an auto-tuner operatively associated with the waveguide and configured to detect reflected power of microwave radiation in the waveguide resulting from the degree of the impedance matching between the applicator and the animal's head and which tunes the waveguide to reduce the reflected power and increase the transfer of microwave power to the animal's head;
  a monitoring device comprising at least one of:
    a visual display responsive to operation of the generator and the auto-tuner and operative to display the microwave power being generated in use by the microwave generator to enable monitoring of an effective power transfer to the animal's head and visual assessment of an effective syncope; or
    a memory device operative to continually log during the operation of the apparatus the microwave power being generated by the microwave generator to provide a stored record of parameters of an animal stunning operation for subsequent analysis for regulatory compliance, process research, and operation management purposes;
    wherein the microwave power is determined from the generated microwave energy and the reflected power as being transferred through the applicator operation; and
  a switch operable to discontinue the application of microwave radiation effecting heating of the frontal portion of the brain after a period of time sufficient to raise the temperature of the frontal portion of the brain of the subject animal to thereby induce the unconsciousness and insensibility.

2. The apparatus of claim 1, wherein the auto-tuner is operable in an iterative manner to continually tune the waveguide during the application of the microwave radiation to continually improve or maintain impedance matching while the impedance of the animal's head changes due to heating.

3. The apparatus of claim 1, wherein the applicator has an opening therein for coupling the microwave radiation from the waveguide to the animal's head at the application point, the peripheral portions of the applicator defining the opening contacting the animal's head to surround the application point when the applicator is in its operative position.

4. The apparatus of claim 3, wherein the peripheral portions of the applicator are yieldable in order to be configured to conform in shape to the shape of the animal's head at the application point upon relative operative positioning of the applicator at the application point.

5. The apparatus of claim 4, wherein the peripheral portions of the applicator are configured to conform to the surface shape of the animal's head at the application point, the peripheral portions of the applicator being impermeable to microwave radiation.

6. The apparatus of claim 5, wherein the peripheral portions of the applicator defining the opening are flexible in order to be configured to conform to the surface shape, to be impermeable to microwave radiation, and to be resilient to substantially return to an initial state after relative separation of the applicator from the application point.

7. The apparatus of claim 6, wherein the peripheral portions of the applicator defining the opening are composed of metallic braid.

8. The apparatus of claim 3, wherein the waveguide or applicator includes a movable joint or section enabling limited movement of the applicator to improve contact of the peripheral portions of the applicator defining the opening for different relative positions and conformations of the animal's head and to limit microwave leakage at the application point.

9. The apparatus of claim 8, wherein the moveable joint or section is configured to enable limited movement of the applicator about two orthogonal axes which are generally parallel to the surface of the animal's head at the application point where the animal's head is located for contact with the applicator.

10. The apparatus of claim 9, further comprising a head detector switch mounted by the applicator and operable to switch its state only upon achievement of positive sealing contact of the applicator with the animal's head at the application point.

11. The apparatus of claim 10, wherein the head detector switch is configured to switch states only upon deformation of flexible peripheral portions of the applicator being flexed to an extent achieved when close contact of the applicator with the surface of the animal's head at the application point has been achieved, the switch being connected in a circuit preventing application of microwave radiation to the animal's head until the switch has changed its state indicative of effective sealing contact of the applicator with the animal's head.

12. An animal stunning apparatus for inducing unconsciousness and insensibility of a live subject animal, the apparatus comprising:
an applicator relatively movable in relation to the live subject animal's head for bringing the applicator into contact with an application point defined on the animal's head overlying a frontal portion of the animal's brain, the applicator having a coupling conformation to couple microwave radiation therethrough to the head and to the frontal portion of the brain of the subject animal when in contact with the application point on the animal's head;
a microwave generator for generating and radiating microwave energy of a suitable power level and frequency;
a waveguide located to receive and direct the microwave radiation from the generator to the applicator located at an operative end of the waveguide to heat the frontal portion of the brain of the subject animal beneath the application point which the applicator contacts in use;
an auto-tuner operatively associated with the waveguide and configured to detect reflected power of microwave radiation in the waveguide resulting from the degree of the impedance matching between the applicator and the animal's head and which tunes the waveguide to reduce the reflected power and increase the transfer of microwave power to the animal's head;
a visual display responsive to operation of the generator and the auto-tuner and operative to display the microwave power being generated in use by the microwave generator to enable monitoring of an effective power transfer to the animal's head and visual assessment of an effective syncope, wherein the microwave power is determined from the generated microwave energy and the reflected power as being transferred through the applicator operation;
a memory device operative to continually log during the operation of the apparatus the microwave power being generated by the microwave generator to provide a stored record of parameters of an animal stunning operation for subsequent analysis for regulatory compliance, process research, and operation management purposes; and
a switch operable to discontinue the application of microwave radiation effecting heating of the frontal portion of the brain after a period of time sufficient to raise the temperature of the frontal portion of the brain of the subject animal to thereby induce the unconsciousness and insensibility.

13. A method of stunning an animal for inducing unconsciousness and insensibility of the animal, the method comprising:
locating an applicator in contact with an application point on the animal's head immediately overlying the frontal portion of the subject animal's brain, the applicator having a coupling conformation to couple microwave radiation through the applicator to the head and to the frontal portion of the brain of the subject animal;
generating microwave radiation of a suitable power level and frequency and directing the radiation through a waveguide to the applicator at an operative end of the waveguide to heat the frontal portion of the brain of the subject animal;
detecting reflected power of microwave radiation in the waveguide and, in response to the level of the reflected power, tuning the waveguide so as to reduce the reflected power being detected by changing the impedance of the waveguide and the applicator to substantially conform with the impedance of the head and thereby increase the transfer of microwave power to the head;
visually displaying during the stunning operation the microwave power being generated by the microwave generator, the microwave power being detected as reflected within the waveguide and arising from the degree of the impedance matching with the head, and the power determined from the generated and reflected power as being transferred through the applicator throughout the stunning operation thereby enabling visual monitoring of the effective power transfer and visual assessment of an effective syncope of the animal;
continually logging during the stunning operation the microwave power being generated by the microwave generator, the microwave power being detected as reflected within the waveguide and arising from the degree of the impedance matching with the head, and the power determined from the generated and reflected power as being transferred through the applicator throughout the stunning operation so as to provide a stored record of parameters of the stunning operation for subsequent analysis for regulatory compliance, process research, and operation management purposes; and
continuing the application of the microwave radiation to effect the heating for a period of time to raise the temperature of the frontal portion of the brain, the period being sufficient to induce insensibility.

14. The method according to claim 13, further comprising positioning the applicator in contact with the application point that is medially located on the head of the subject animal above a line extending between the animal's eyes so as to be located at the closest external point to the central and frontal portion of the brain.

15. The method according to claim 13, further comprising heating the frontal portion of the brain of the subject animal until at least one of the conditions:
the temperature increases by an amount in the range of about 5° C. to about 10° C.; or
the temperature increases to about 43° C.

16. The method according to claim 13, wherein a period of time during which application of the microwave radiation is continued and during which the tuning is continually performed is terminated after a period for an effective power transfer defined as sufficient for an effective syncope of the animal, the effective power transfer being determined as a function of power transferred to the animal's head excluding reflected power.

17. The method according to claim 16, further comprising:
continually measuring the power of microwave radiation being reflected; and
determining from the power generated by the microwave generator and from the measured reflected power the actual power being transferred through the applicator to the animal's head.

18. The method according to claim 17, wherein the effective power transfer is reached by applying microwave power for a predetermined time period which is started only after the power being transferred through the applicator is determined to have reached a predetermined level.

19. The method according to claim 17, wherein the effective power transfer is reached by applying microwave power for a time period sufficient for the sum of the determined power levels being transferred through the applicator for a plurality of time increments reaches a predetermined sum.

20. The method according to claim 17, wherein the detection of microwave radiation reflected in the waveguide is performed using a directional coupler associated with the waveguide and operable to measure the complex reflection coefficient of the load thereby enabling determination in real time of the power being transferred through the applicator.

* * * * *